United States Patent
Faltinski et al.

(10) Patent No.: US 12,118,415 B2
(45) Date of Patent: Oct. 15, 2024

(54) APPARATUS AND METHOD FOR PRINTING ON AN ARTICLE BASED ON PRODUCT DATA OF THE ARTICLE

(71) Applicant: PHOENIX CONTACT GMBH & CO. KG, Blomberg (DE)

(72) Inventors: Sebastian Faltinski, Lemgo (DE); Timo Weber, Detmold (DE); Mattes Reitz, Lemgo (DE); Matthias Tieben, Bad Salzuflen (DE); Marvin Kurde, Paderborn (DE); Sandro Limberg, Blomberg (DE); Jorg Schmidt, Petershagen (DE); Jens Frenser, Detmold (DE); Marcus Mathes, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 526 days.

(21) Appl. No.: 17/292,396

(22) PCT Filed: Nov. 8, 2019

(86) PCT No.: PCT/EP2019/080751
§ 371 (c)(1),
(2) Date: May 7, 2021

(87) PCT Pub. No.: WO2020/094868
PCT Pub. Date: May 14, 2020

(65) Prior Publication Data
US 2022/0009256 A1 Jan. 13, 2022

(30) Foreign Application Priority Data
Nov. 9, 2018 (EP) .................. 18205479

(51) Int. Cl.
*G06K 15/02* (2006.01)
*B41F 33/00* (2006.01)

(52) U.S. Cl.
CPC ...... *G06K 15/1852* (2013.01); *B41F 33/0009* (2013.01); *G06K 15/1815* (2013.01); *G06K 15/1831* (2013.01); *G06K 15/1835* (2013.01)

(58) Field of Classification Search
CPC ......... G06K 15/1815; G06K 15/1831; G06K 15/1835; G06K 15/1852; B41F 33/0009;
(Continued)

(56) References Cited

U.S. PATENT DOCUMENTS 5,144,330 A * 9/1992 Bennett ............ B41J 2/01
347/106
7,440,123 B2 10/2008 Chodagiri et al.
(Continued)

FOREIGN PATENT DOCUMENTS

CN 1367079 A 9/2002
CN 104553304 A 4/2015
(Continued)

OTHER PUBLICATIONS

International Searching Authority. International Search Report and Written Opinion for application PCT/EP2019/080751. Mailed on Feb. 3, 2020. 25 pages. With translation.
(Continued)

*Primary Examiner* — Scott A Rogers
(74) *Attorney, Agent, or Firm* — QUARLES & BRADY LLP

(57) ABSTRACT

The present invention relates to an apparatus for printing an article. The apparatus includes a data providing device adapted to provide article-specific printing data for the article from product data of the article, and to provide machine-specific printing data for the article in dependence
(Continued)

on a printing machine to be used for the printing process. The apparatus also includes a control device adapted to merge the article-specific printing data and the machine-specific printing data, and to control the printing machine for printing the article based thereon.

17 Claims, 2 Drawing Sheets

(58) Field of Classification Search
CPC ........ H04N 1/23; H04N 1/2307; H04N 1/233; H04N 1/2338; H04N 1/2384; H04N 1/387; H04N 1/3872; H04N 1/3873; H04N 1/3875; H04N 1/393; H04N 1/3935; B41M 1/26–40; B41M 5/0041–0094
See application file for complete search history.

(56) References Cited

U.S. PATENT DOCUMENTS

| | | | |
|---|---|---|---|
| 8,361,546 B2 | 1/2013 | Fletcher et al. | |
| 8,733,868 B1* | 5/2014 | Polk | B41J 3/4075 347/101 |
| 9,070,142 B2* | 6/2015 | Krone | B42D 15/02 |
| 9,774,763 B2* | 9/2017 | Schulmeister | H04N 1/6033 |
| 10,357,962 B2* | 7/2019 | Miller | B41J 3/4073 |
| 11,150,849 B2* | 10/2021 | Bogatz | H04N 1/00015 |
| 11,235,495 B2* | 2/2022 | Yamamoto | B29C 59/02 |
| 11,557,032 B2* | 1/2023 | Niederhofer | G06F 3/1208 |
| 2002/0096077 A1 | 7/2002 | Frankenberger | |
| 2013/0151426 A1* | 6/2013 | Whelan | G06Q 30/018 705/317 |
| 2013/0335464 A1 | 12/2013 | Gerber | |
| 2014/0330929 A1 | 11/2014 | Dong et al. | |
| 2015/0178028 A1 | 6/2015 | Elchlepp | |
| 2018/0019129 A1 | 1/2018 | Matsuyama | |
| 2018/0203393 A1 | 7/2018 | Schenk et al. | |
| 2018/0307447 A1* | 10/2018 | Tufano | G06F 3/1288 |
| 2020/0210789 A1* | 7/2020 | Lehrer | G06Q 30/0643 |

FOREIGN PATENT DOCUMENTS

| | | | | |
|---|---|---|---|---|
| DE | 102009046594 A1 | | 5/2011 | |
| DE | 102011075343 A1 | | 11/2012 | |
| EP | 3064354 A1 | | 9/2016 | |
| EP | 3650223 A1 | * | 5/2020 | .......... B41F 33/0036 |
| GB | 2521710 A | | 7/2015 | |
| JP | 2000298569 A | | 10/2000 | |
| JP | 2003108373 A | | 4/2003 | |
| JP | 2006056109 A | | 3/2006 | |
| JP | 2008068612 A | | 3/2008 | |
| JP | 2012091095 A | | 5/2012 | |
| JP | 2014203422 A | * | 10/2014 | |
| JP | 2015158610 A | | 9/2015 | |
| JP | 2016218887 A | | 12/2016 | |
| JP | 2018098306 A | | 6/2018 | |

OTHER PUBLICATIONS

European Patent Office. Extended European Search Report for application 18205479.1. Mailed on Feb. 19, 2019. With translation. 23 pages.

* cited by examiner

APPARATUS AND METHOD FOR PRINTING ON AN ARTICLE BASED ON PRODUCT DATA OF THE ARTICLE

CROSS-REFERENCE TO RELATED APPLICATIONS

The present application is the US National Phase of PCT Application No. PCT/EP2019/080751, filed Nov. 8, 2019, which claims priority to EP 18205479.1, filed Nov. 9, 2018, each of which is incorporated herein by reference in its entirety for all purposes.

TECHNICAL FIELD

The present invention relates to systems for printing and labeling production goods.

In particular, the present invention relates to an apparatus and method for printing on an article.

TECHNICAL BACKGROUND

The printing process for freely configurable articles requires that articles or production goods are also printed for which no corresponding data for printing is available in a print data format, for example because the articles are customized and created by product configurators with a modular structure.

SUMMARY OF THE INVENTION

It is an object of the present invention to provide an improved device and an improved method for printing on and/or labeling production goods.

This object is solved by the objects of the independent patent claims. Further embodiments and embodiments can be found in the dependent patent claims, the description and the figures of the drawings.

A first aspect of the present invention relates to an apparatus for printing on an article, the apparatus comprising a data providing device and a control device.

The data providing device is adapted to provide article-specific printing data for the article from product data of the article, and to provide machine-specific printing data for the article in dependence on a printing machine to be used for the printing process.

The control device is designed to combine the article-specific printing data and the machine-specific printing data and, based on this, to control the printing machine for printing on the article.

The providing of the article-specific printing data for the article from the product data takes place, for example, in a partially or fully automated approach and with partially or fully computer-aided processes.

In other words, for example, an adapted and automated extraction of the relevant data and a likewise adapted and automated transformation of the product data takes place. The providing of the article-specific printing data for the article from the product data comprises, for example, a data extraction by means of which article-specific printing data is extracted from the product data in a partially or fully automated manner.

For example, a computer-aided data transformation takes place, which changes the product data by data cleansing and transforms the changed product data into printing data in a suitable storage format/structure for printing.

Providing the item-specific imprinting data for the item from the product data includes, for example, checking data quality and data consistency standards of the item-specific imprinting data.

The present invention enables customized printing on a customer-specific and freely configured article of which only product data is known.

The product data is stored, for example, in a neutral format, also referred to as neutral data format, and the neutral format describes and defines the article and, for example, its customer configuration without specifically going into further detail about a (production) facility or a manufacturing process used to produce the article.

The neutral data contains, for example, information on the dimensions, such as the height, width, depth of the article or a position of printing areas and cable entry openings of the article, or positions of the screws or the pitch of the article.

Providing item-specific printing data for the item from the product data includes, for example, details and information about the text to be printed, the font and size, the foreground and background colors, or the position of individual characters relative to a reference point (e.g., lower left corner) of the item.

The present invention makes it possible to ensure flexible printing on a freely configurable article adapted to a particular printing machine.

The present invention advantageously enables printing data for freely configurable-limited configurable or unlimited configurable-articles to be created from the existing product data and used accordingly for printing.

The product data is created by the configurator and the present invention advantageously enables the required printing to be derived from the product data, which is available in neutral data format, for example. In other words, a virtual or simulated generation of the printed image from the product data takes place.

Advantageously, the present invention enables the printing information for the article to be generated from the product data during production of the article. For example, article-specific properties defined in the product data, such as a pitch dimension, and machine-specific properties are taken into account.

In this process, for example, the product data in the form of the neutral format is combined with machine-specific data of the printing machine in order to generate a correct printed image.

Advantageous embodiments of the present invention can be found in the dependent claims.

In an advantageous embodiment of the present invention, it is provided that the data providing device is adapted to provide printing process-specific printing data for the article in dependence on a printing process to be used.

In an advantageous embodiment of the present invention, it is provided that the control device is designed to combine the article-specific printing data and the machine-specific printing data and the printing process-specific printing data and, based thereon, to control the printing machine for printing on the article.

In an advantageous embodiment of the present invention, it is provided that the printing process-specific printing data comprises data for an application of an adhesion promoter, and the printing process comprises an application process of the adhesion promoter in preparation for a printing process.

In an advantageous embodiment of the present invention, it is provided that the article-specific printing data comprises data on:

i) a number of voltage carrying conductors; and/or
ii) a pitch dimension; and/or
iii) a conductor cross-section; and/or
iv) a number of line poles; and/or
v) a dimension; and/or
vi) a rated uninterrupted current; and/or
vii) a marking text; and/or
viii) an article color; and/or
ix) an article material.

In an advantageous embodiment of the present invention, it is provided that the machine-specific printing data includes data on:
(i) a printing resolution of the printing press used for the printing process; and/or
ii) a solid ink density of the printing machine used for the printing process; and/or
iii) a printing performance of the printing press used for the printing process; and/or
iv) a format specification of the printing press used for the printing process; and/or
v) a maximum printing area of the printing press used for the printing process; and/or
vi) a minimum printing area of the printing press used for the printing process; and/or
vii) inks printable with the printing machine.

In an advantageous embodiment of the present invention, it is provided that the configurator is adapted to perform a revision of the system configuration for the I/O station after each individual data change.

In an advantageous embodiment of the present invention, it is provided that the product data is provided in a neutral data format.

In an advantageous embodiment of the present invention, it is provided that the neutral data format is an:
i) XML format; and/or
ii) platform-independent data format; and/or
iii) implementation-independent data format; and/or
iv) M2M data format.

In an advantageous embodiment of the present invention, it is provided that the device further comprises an interface device adapted to provide the article-specific printing data, which is provided for the article from a description of the article.

In an advantageous embodiment of the present invention, it is provided that the data providing device is adapted to transmit the article-specific printing data and/or the machine-specific printing data to a computer network coupled to the apparatus.

In an advantageous embodiment of the present invention, it is provided that the control device is adapted to combine the article-specific printing data and the machine-specific printing data into fused printing data and, based on the fused printing data, to control the printing machine to print on the article.

In a second aspect of the present invention, a method for printing on an article is provided, comprising the following method steps:

As a first step of the method, an article-specific printing data for the article is provided from product data of the article by means of a data providing device.

As a second step of the method, machine-specific printing data is provided as a function of a printing machine to be used for the printing process by means of a data providing device.

As a third step of the method, the article-specific printing data and the machine-specific printing data are combined by means of a control device.

As a fourth step of the method, the printing press for printing on the article is controlled by means of the control device on the basis of the combined article-specific and machine-specific printing data.

In an advantageous embodiment of the present invention, it is provided that the method further comprises the following method steps: providing printing process-specific printing data for the article as a function of a printing process to be used, by means of the data providing device, and combining the article-specific printing data and the machine-specific printing data and the printing-process-specific printing data and, based thereon, controlling the printing machine for printing on the article.

In an advantageous embodiment of the present invention, it is provided that wherein the printing process-specific printing data comprises data for an application of an adhesion promoter, and the printing process comprises an application process of the adhesion promoter in preparation for a printing process.

In an advantageous embodiment of the present invention, it is provided that the article-specific printing data includes data on:
(i) a number of voltage carrying conductors; and/or
ii) a pitch dimension; and/or
iii) a conductor cross-section; and/or
iv) a number of line poles; and/or
v) a dimension; and/or
(vi) a rated uninterrupted current; and/or
vii) a marking text; and/or
viii) an article color; and/or
(ix) an article material.

In an advantageous embodiment of the present invention, it is provided that the machine-specific printing data includes data on:
(i) a printing resolution of the printing press used for the printing process; and/or
ii) a solid ink density of the printing machine used for the printing process; and/or
iii) a printing performance of the printing press used for the printing process; and/or
iv) a format specification of the printing press used for the printing process; and/or
v) a maximum printing area of the printing press used for the printing process; and/or
vi) a minimum printing area of the printing press used for the printing process; and/or
vii) inks printable with the printing machine.

In an advantageous embodiment of the present invention, it is provided that the neutral data format is an.
i) XML format; and/or
ii) platform-independent data format; and/or
iii) implementation independent data format; and/or
iv) M2M data format.

In an advantageous embodiment of the present invention, it is provided that the item-specific printing data for the item is provided from a description of the item.

In an advantageous embodiment of the present invention, it is provided that the article-specific printing data and the machine-specific printing data are merged to form merged printing data, and based on the merged printing data, the printing machine is controlled to print on the article.

In a third aspect of the present invention, there is provided a computer program or computer program product comprising instructions which, when the program is executed by a computer, cause the computer to execute the steps of the method for printing on an article in accordance with the second aspect of the present invention.

In a fourth aspect of the present invention, there is provided a computer readable (storage) medium comprising instructions which, when executed by a computer, cause the computer to perform the steps of the method of printing on an article in accordance with the second aspect of the present invention.

The described embodiments and further embodiments may be combined with each other as desired.

Other possible embodiments, further embodiments and implementations of the present invention also include combinations, not explicitly mentioned, of features of the present invention described previously or hereinafter with respect to the embodiments.

The accompanying drawings are intended to provide a further understanding of embodiments of the present invention.

The accompanying drawings illustrate embodiments and, in connection with the description, serve to explain concepts of the present invention.

Other embodiments and many of the advantages mentioned will be apparent with reference to the figures of the drawings. The elements shown in the figures of the drawings are not necessarily shown to scale with respect to each other.

BRIEF DESCRIPTION OF THE FIGURES

Showing.

DETAILED DESCRIPTION OF THE EMBODIMENTS

In the figures of the drawings, identical reference signs denote identical or functionally identical elements, parts, components or process steps, unless otherwise indicated.

Figure 1:
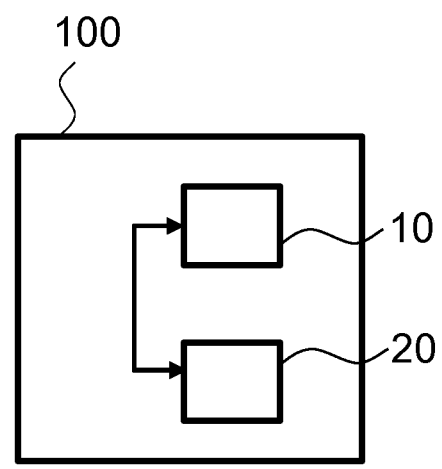
FIG. 1: a schematic diagram of an apparatus for printing on an article in accordance with an embodiment of the present invention.

FIG. 1 shows a schematic representation of a device for printing on an article in accordance with an embodiment of the present invention.

The term "neutral data format" as used by the present invention includes, for example, data or file formats for neutral file exchange between units, such as computers, of a computer network.

The term "neutral data format" as used by the present invention can be understood, for example, as an intermediate file format to translate data between participating systems of the computer network, such as production systems or ordering systems—webshop—or internal data processing systems—backend.

In other words, a neutral file is generated from original data available in other file formats. However, the target system can read and process the neutral file, unlike the original data.

For example, the term "product data", in particular product data of the article, as used by the present invention describes data that defines and classifies an article, in particular according to customer-specific configuration. In other words, the product data describes and identifies parameters, characteristics, and design options of the article.

The apparatus 100 includes a data providing device 10 and a control device 20.

The data providing device 10 is adapted to provide article-specific printing data for the article from product data of the article, and to provide machine-specific printing data for the article in dependence on a printing machine to be used for the printing process.

Optionally, the product data is provided in a neutral data format.

The control device 20 is configured to combine the article-specific printing data and the machine-specific printing data and, based thereon, to control the printing machine for printing on the article.

Figure 2:
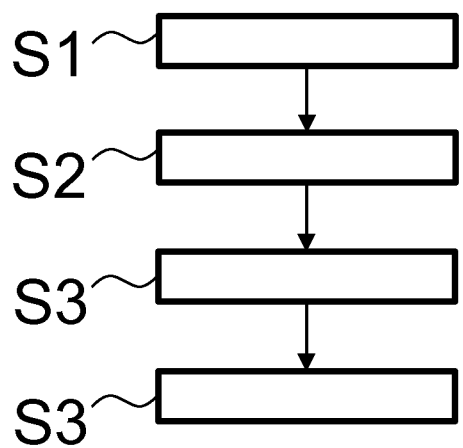
FIG. 2: a schematic diagram of a flow chart of a method for printing on an article according to an embodiment example of the present invention.

FIG. 2 shows a schematic representation of a flow chart of a method for printing on an article according to an embodiment example of the present invention.

As a first method step, a providing S1 of article-specific printing data for the article is carried out based on product data of the article by means of a data providing device.

As a second method step, machine-specific printing data is provided S2 as a function of a printing machine to be used for the printing process by means of a data providing device.

As a third process step, the article-specific printing data and the machine-specific printing data are combined S3 by means of a control device.

As a fourth process step, the printing machine is controlled S4 to print on the article by means of the control device.

Although the present invention has been described above with reference to preferred embodiments, it is not limited thereto, but can be modified in a variety of ways. In particular, the invention can be changed or modified in a variety of ways without departing from the essence of the invention.

Additionally, it should be noted that "comprising" and "comprising" do not exclude other elements or steps, and "one" or "a" do not exclude a plurality.

The invention claimed is:

1. An apparatus for printing on an article, the apparatus comprising:
    a data providing device, which is designed to provide article-specific printing data for the article from product data of the article and to provide machine-specific printing data for the article in dependence on a printing machine to be used for the printing process, wherein the data providing device is designed to provide the article-specific printing data for the article from the product data of the article present in a neutral data format, which define and classify the article according to customer-specific configuration and which describe parameters, properties and design options of the article; and
    a control device which is designed to combine the article-specific printing data and the machine-specific printing data and, based thereon, to control the printing machine for printing on the article.

2. The apparatus according to claim 1, wherein the data providing device is designed to provide printing process-specific printing data for the article as a function of a printing process to be used; wherein the control device is designed to combine the article-specific printing data and the machine-specific printing data and the printing-process-specific printing data and, based thereon, to control the printing machine for printing on the article.

3. The apparatus according to claim 2, wherein the printing process-specific printing data comprises data for an application of an adhesion promoter, and the printing process comprises an application process of the adhesion promoter in preparation for a printing process.

4. The apparatus according to claim 1, wherein the article-specific printing data comprises data on at least one of:
   i) a number of voltage carrying conductors;
   ii) a pitch dimension;
   iii) a conductor cross-section;
   iv) a number of line poles;
   v) a dimension;
   vi) a rated uninterrupted current;
   vii) a marking text;
   viii) an article color; or
   ix) an article material.

5. The apparatus according to claim 1, wherein the machine-specific printing data comprises data on at least one of:
   i) a printing resolution of the printing press used for the printing process;
   ii) a solid ink density of the printing machine used for the printing process;
   iii) a printing performance of the printing press used for the printing process;
   iv) a format specification of the printing press used for the printing process;
   v) a maximum printing area of the printing press used for the printing process;
   vi) a minimum printing area of the printing press used for the printing process; or
   vii) inks printable with the printing machine.

6. The apparatus according to claim 1, wherein the data providing device is designed to provide the article-specific printing data for the article from the product data of the article present in a neutral data format; and wherein the neutral data format includes at least one of:
   i) XML format;
   ii) platform-independent data format;
   iii) implementation independent data format; or
   iv) M2M data format.

7. The apparatus according to claim 1, comprising an interface device adapted to provide the article-specific printing data, which is provided for the article from a description of the article.

8. The apparatus according to claim 1, wherein the data providing device is designed to transmit the article-specific printing data and/or the machine-specific printing data to a computer network coupled to the device.

9. The apparatus according to claim 1, wherein the control device is designed to combine the article-specific printing data and the machine-specific printing data to form merged printing data and, based on the merged printing data, to control the printing machine for printing on the article.

10. A method for printing on an article, the method including steps comprising:
   providing article-specific printing data in a neutral data format for the article from product data of the article by means of a data providing device, wherein the article-specific printing data for the article are provided from the product data of the article present in a neutral data format, which define and classify the article according to customer-specific configuration and which describe parameters, properties and design options of the article;
   providing machine-specific printing data as a function of a printing machine to be used for the printing process by means of a data providing device;
   combining the article-specific printing data and the machine-specific printing data by means of a control device;
   based thereon, driving the printing machine for printing on the article by means of the control device.

11. The method according to claim 10, wherein the method further includes steps comprising:
   providing printing process-specific printing data for the article in dependence on a printing process to be used by means of the data providing device; and
   combining the article-specific printing data and the machine-specific printing data and the printing-process-specific printing data and, based thereon, driving the printing machine to print on the article.

12. The method according to claim 10, wherein the printing process-specific printing data comprises data for an application of an adhesion promoter and the printing process comprises an application process of the adhesion promoter in preparation for a printing process.

13. The method according to claim 10, wherein the article-specific printing data comprises data on at least one of:
   i) a number of voltage carrying conductors;
   ii) a pitch dimension;
   iii) a conductor cross-section;
   iv) a number of line poles;
   v) a dimension;
   vi) a rated uninterrupted current;
   vii) a marking text;
   viii) an article color; or
   ix) an article material.

14. The method according to claim 10, wherein the machine-specific printing data comprises data on at least one of:
   i) a printing resolution of the printing machine used for the printing process;
   ii) a solid ink density of the printing machine used for the printing process;
   iii) a printing performance of the printing press used for the printing process;
   iv) a format specification of the printing press used for the printing process;
   v) a maximum printing area of the printing press used for the printing process;
   vi) a minimum printing area of the printing press used for the printing process; or
   vii) inks printable with the printing machine.

15. The method according to claim 10, wherein the article-specific printing data for the article are provided from the product data of the article present in a neutral data format; and wherein the neutral data format includes at least one of:
   i) XML format;
   ii) platform-independent data format;
   iii) implementation independent data format; or
   iv) M2M data format.

16. The method according to claim 10, wherein the article-specific printing data for the article is provided from a description of the article.

17. The method according to claim 10, wherein the article-specific printing data and the machine-specific printing data are combined to form merged printing data, and the printing machine for printing on the article is controlled based on the merged printing data.

* * * * *

UNITED STATES PATENT AND TRADEMARK OFFICE
CERTIFICATE OF CORRECTION

| | |
|---|---|
| PATENT NO. | : 12,118,415 B2 |
| APPLICATION NO. | : 17/292396 |
| DATED | : October 15, 2024 |
| INVENTOR(S) | : Sebastian Faltinski et al. |

It is certified that error appears in the above-identified patent and that said Letters Patent is hereby corrected as shown below:

In the Specification

Column 2, Line 1, "imprinting" should be --printing--.

Signed and Sealed this
Seventeenth Day of December, 2024

Derrick Brent
*Acting Director of the United States Patent and Trademark Office*